(12) United States Patent
Kim

(10) Patent No.: US 11,636,670 B2
(45) Date of Patent: Apr. 25, 2023

(54) METHOD FOR RECOGNIZING OBJECT IN IMAGE

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/256,582

(22) PCT Filed: Jun. 4, 2020

(86) PCT No.: PCT/KR2020/007303
§ 371 (c)(1),
(2) Date: Dec. 28, 2020

(87) PCT Pub. No.: WO2020/246834
PCT Pub. Date: Dec. 10, 2020

(65) Prior Publication Data
US 2022/0083797 A1     Mar. 17, 2022

(30) Foreign Application Priority Data
Dec. 28, 2018 (KR) .................. 10-2019-0066240

(51) Int. Cl.
| | |
|---|---|
| *G06K 9/00* | (2022.01) |
| *G06V 10/94* | (2022.01) |
| *G06T 7/73* | (2017.01) |
| *G06T 7/10* | (2017.01) |

(Continued)

(52) U.S. Cl.
CPC ........... *G06V 10/95* (2022.01); *G06K 9/6257* (2013.01); *G06K 9/6262* (2013.01); *G06K 9/6267* (2013.01); *G06T 5/002* (2013.01); *G06T 5/003* (2013.01); *G06T 5/009* (2013.01); *G06T 7/10* (2017.01); *G06T 7/74* (2017.01); *G06T 2207/20081* (2013.01); *G06T 2207/20084* (2013.01); *G06T 2207/20208* (2013.01)

(58) Field of Classification Search
CPC .... G06V 10/95; G06K 9/6257; G06K 9/6262; G06K 9/6267; G06T 5/002; G06T 5/003; G06T 5/009; G06T 7/10; G06T 7/74; G06T 2207/20081; G06T 2207/20084; G06T 2207/20208
USPC ....................................................... 382/103
See application file for complete search history.

(56) References Cited

FOREIGN PATENT DOCUMENTS

| | | |
|---|---|---|
| KR | 10-2011-0054886 A | 5/2011 |
| KR | 10-1802500 B1 | 11/2017 |
| KR | 10-2019-0016367 A | 2/2019 |

(Continued)

OTHER PUBLICATIONS

Sharma, Vivek, et al. "Classification Driven Dynamic Image Enhancement." arXiv preprint arXiv:1710.07558 (2018). (Year: 2018).*

*Primary Examiner* — Jonathan S Lee
(74) *Attorney, Agent, or Firm* — Ivenstone Patent, LLC

(57) ABSTRACT

An apparatus for recognizing an object in an image includes a preprocessing module configured to receive an image including an object and to output a preprocessed image by performing image enhancement processing on the received image to improve a recognition rate of the object included in the received image; and an object recognition module configured to recognize the object included in the image by inputting the preprocessed image to an input layer of an artificial neural network for object recognition.

12 Claims, 8 Drawing Sheets

(51) Int. Cl.
*G06K 9/62* (2022.01)
*G06T 5/00* (2006.01)

(56) References Cited

FOREIGN PATENT DOCUMENTS

| KR | 10-2019-0034021 A | 4/2019 |
|----|-------------------|--------|
| KR | 10-1982231 B1 | 5/2019 |
| KR | 10-2097905 B1 | 4/2020 |

* cited by examiner

210

220

METHOD FOR RECOGNIZING OBJECT IN IMAGE

CROSS-REFERENCE TO RELATED APPLICATIONS

This application is a national stage of International Application No. PCT/KR2020/007303, filed on Jun. 4, 2020, which claims the benefit of priority to Korean Application No. 10-2019-0066240, filed on Dec. 28, 2018 in the Korean Intellectual Property Office, the disclosures of which are incorporated herein by reference.

BACKGROUND OF THE DISCLOSURE

Field of the Invention

The present disclosure relates to an apparatus and method for recognizing an object in an image, and more particularly, relates to an apparatus and method for recognizing an object in an image by outputting a preprocessed image through image enhancement processing of an image, and inputting the preprocessed image to an artificial neural network for object recognition.

Description of the Background Art

Recently, studies for detecting or recognizing objects in images captured from cameras by grafting technologies using artificial intelligence and big data onto an apparatus equipped with a camera are being conducted. For example, an artificial intelligence-based object recognizer may be applied to apparatuses equipped with cameras such as autonomous driving vehicles, surveillance cameras, drones, and the like. When such an artificial intelligence-based object recognizer recognizes an object in an image captured by a camera with a recognition rate higher than or equal to a predetermined level, apparatuses equipped with such a camera and object recognizer can provide services such as autonomous driving based on the recognized object.

In autonomous driving, driving safety can be guaranteed only when the surrounding environment is understood and recognized at a high level under any conditions. Accordingly, to implement functions associated with intelligent driving and autonomous driving, such as forward collision avoidance and the like, it is necessary to recognize the driving environment. For object recognition technologies for autonomous driving, it is necessary not only to obtain information by understanding the surrounding environment with a sensor such as a camera or radar installed in a vehicle or drone, but also to recognize various objects existing in a variously and rapidly changing driving environment with high accuracy, in real time.

In recent years, object recognition technologies using a deep-learning processor through machine learning has been developed. Application of a high-performance general-purpose deep-learning processor to conventional autonomous driving cars has been impeded by a degradation of stability caused by heat generation, and application to surveillance cameras and drones has been impeded by high power consumption. Therefore, there is a need for a technology capable of minimizing power consumption and heat generation while satisfying performance required for autonomous driving using artificial intelligence.

SUMMARY OF THE DISCLOSURE

Accordingly, the present disclosure is developed to solve the above problems. An aspect of the present disclosure provides a method for recognizing an object with higher accuracy by receiving an image, performing image enhancement processing on the received image to increase a recognition rate of an object in the received image, and recognizing the object included in the image where image enhancement processing has been performed through an artificial neural network for object recognition. Another aspect of the present disclosure provides an apparatus for performing the method.

In addition to the aspects mentioned above, other features and advantages of the disclosure are described below and can be clearly understood by those skilled in the art to which the disclosure pertains from the following description.

According to an aspect of an exemplary embodiment, there is provided an apparatus for recognizing an object in an image. The apparatus may include a preprocessing module configured to receive an image including the object, and output a preprocessed image by performing image enhancement processing on the received image to increase a recognition rate of the object included in the received image; and an object recognition module configured to recognize the object included in the image by inputting the preprocessed image to an input layer of an artificial neural network for object recognition, wherein the preprocessing module is further configured to output the preprocessed image by inputting the received image including the object to an artificial neural network for preprocessing, so as to increase the recognition rate of the object included in the received image in the artificial neural network for object recognition, wherein the preprocessing module includes a training module that trains the artificial neural network for preprocessing to infer a plurality of preprocessed reference images optimized for an increase in object recognition rate through the artificial neural network for object recognition by imputing a plurality of reference images to an input layer of the artificial neural network for preprocessing, and wherein each of the plurality of reference images includes an object.

The object recognition module may be further configured to generate a feedback result associated with a recognition result of the object included in each of the plurality of preprocessed reference images by inputting the plurality of preprocessed reference images to the input layer of the artificial neural network for object recognition, and the preprocessing module is further configured to train the artificial neural network for preprocessing using the feedback result.

The object recognition module may be further configured to generate a feedback result associated with a recognition result of the object included in the preprocessed image, and the preprocessing module is further configured to train the artificial neural network for preprocessing using the feedback result associated with the recognition result of the object included in the preprocessed image.

The artificial neural network for object recognition may include a deep neural network including a plurality of layers and the object recognition module is further configured to infer a type and location of the object included in the preprocessed image input through the artificial neural network for object recognition.

According to another aspect of an exemplary embodiment, there is provided an apparatus for recognizing an object in an image. The apparatus may include a preprocessing module configured to receive an image including the object, and output a preprocessed image by performing at least one image enhancement processing among denoise operation processing, deblur operation processing, high dynamic range operation processing, color tone mapping operation processing, defog operation processing, brightness operation processing, contrast operation processing, auto white balance operation processing, back light compensation operation processing, or decompression operation processing, on the received image, so as to increase a recognition rate of the object included in the received image; and an object recognition module configured to recognize the object included in the image by inputting the preprocessed image to an input layer of an artificial neural network for object recognition.

The preprocessing module may be further configured to perform image enhancement process on the received image by adjusting an image parameter representing the received image.

The image parameter may include a plurality of image sub-parameters representing the received image, and the preprocessing module may be configured to sequentially perform image enhancement process on each of the plurality of image sub-parameters.

According to another aspect of an exemplary embodiment, there is provided a method for recognizing an object in an image. The method may include receiving an image including the object; outputting a preprocessed image by performing image enhancement processing on the received image, by a preprocessing module, so as to increase a recognition rate of the object included in the received image; and recognizing the object included in the image by inputting the preprocessed image to an input layer of an artificial neural network for object recognition, by an object recognition module, wherein the outputting of the preprocessed image by the preprocessing module includes outputting the preprocessed image by inputting the received image including the object to an input layer of an artificial neural network for preprocessing so as to increase a recognition rate of the object included in the received image, wherein the outputting of the preprocessed image by the preprocessing module includes training the artificial neural network for preprocessing to infer a plurality of preprocessed reference images optimized for an increase in object recognition rate through the artificial neural network for object recognition by imputing a plurality of reference images to the input layer of the artificial neural network for preprocessing, and wherein each of the plurality of reference images includes an object.

According to another aspect of an exemplary embodiment, there is provided a method for recognizing an object in an image. The method may include receiving an image including the object; outputting a preprocessed image, by a preprocessing module, by performing at least one image enhancement processing among denoise operation processing, deblur operation processing, high dynamic range operation processing, color tone mapping operation processing, defog operation processing, brightness operation processing, contrast operation processing, auto white balance operation processing, back light compensation operation processing, and decompression operation processing, on the received image, so as to increase a recognition rate of the object included in the received image; and recognizing the object included in the image by inputting the preprocessed image to an input layer of an artificial neural network for object recognition, by an object recognition module.

According to various embodiments of the present disclosure, it is possible to recognize an object with high accuracy by performing image enhancement processing on an image received from an external device to increase a recognition rate of the object, which is executed by an artificial neural network, and recognizing the object included in the image where the image enhancement processing has been performed through the artificial neural network for object recognition.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION OF THE DISCLOSURE

Figure 1A:
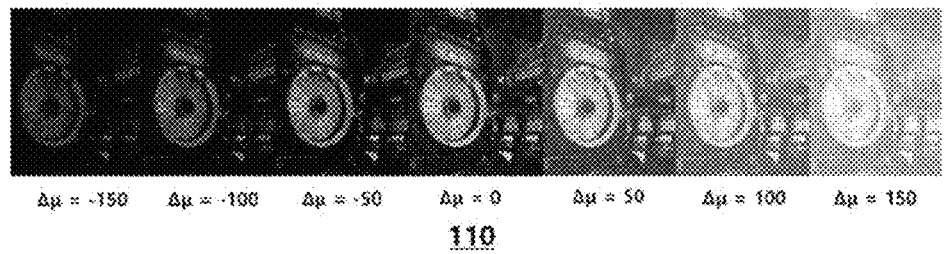
FIG. 1A is a series of exemplary consequent images.

Hereinafter, embodiments of the present disclosure will be described in detail with reference to the accompanying drawings. In the following description, however, well-known functions or constructions will not be described in detail in case of obscuring the subject matter of the present disclosure.

In the accompanying drawings, the same or corresponding components refer to the same reference numerals. In addition, in the description of the following embodiments, overlapping descriptions of the same or corresponding components may be omitted. However, even if description of a component is omitted, it is not intended that such component is not included in any embodiment.

Advantages and features of disclosed embodiments and a method of achieving the advantages and features will be apparent by referring to embodiments described below in connection with the accompanying drawings. However, the present disclosure is not restricted by these embodiments but can be implemented in many different forms, and the present embodiments are provided to complete the present disclosure and to allow those having ordinary skill in the art to understand the scope of the disclosure.

The terms used in this specification will be briefly described, and the disclosed embodiments will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, rather than being simply construed based on names of the terms.

In this specification, singular expressions are intended to include plural expressions as well, unless the context clearly specifies that they are singular. In addition, plural expressions include singular expressions unless they are explicitly specified as plural in context.

Throughout the specification, when an element "includes" or "comprises" a component, it may indicate that the element does not exclude another component unless referred to the contrary, but can further include another component.

As used herein, the term "portion," "unit," or "module" refers to a software or hardware component that performs predetermined functions. However, the term "portion," "module," or "unit" is not limited to software or hardware. The "portion," "unit," or "module" may be configured in an addressable storage medium, or may be configured to run on at least one processor. Therefore, as an example, the "portion," "unit," or "module" includes components such as software components, object-oriented software components, class components, and task components; and processors, functions, attributes, procedures, sub-routines, segments of program codes, drivers, firmware, micro-codes, circuits, data, databases, data structures, tables, arrays, and variables. Functions provided in the components and "portions," "modules," or "units" may be combined into a smaller number of components and "portions," "modules," and "units," or sub-divided into additional components and "portions," "modules," or "units."

In an embodiment of the present disclosure, the "portion," "unit," or "module" may be implemented as a processor and a memory. The term "processor" should be interpreted in a broad sense to include a general-purpose processor, a central processing unit (CPU), a microprocessor, a digital signal processor (DSP), a controller, a microcontroller, a state machine, and the like. In some embodiments, the "processor" may indicate an application-specific integrated circuit (ASIC), a programmable logic device (PLD), a field programmable gate array (FPGA), or the like. The term "processor" may indicate a combination of processing devices, such as a combination of a DSP and a microprocessor, a combination of a plurality of microprocessors, a combination of one or more microprocessors coupled to a DSP core, or a combination of arbitrary other similar components.

In addition, in this specification, the term "server" or "client" may include "server device" or "client device," respectively.

In addition, the term "memory" should be interpreted in a broad sense to include an arbitrary electronic component capable of storing electronic information. The term "memory" may indicate various types of processor-readable medium, such as random-access memory (RAM), read only memory (ROM), non-volatile RAM (NVRAM), programmable ROM (PROM), erasable programmable ROM (EPROM), electrically erasable PROM (EEPROM), flash memory, a magnetic or optical data storage device, registers, and the like. When a processor can read information from a memory and/or record information in the memory, the memory can be considered to electronically communicate with the processor. A memory integrated into a processor electronically communicates with the processor.

In addition, the term "real time" means that an electronic switching system or a common control system must continue to process information which is input continuously without interruption, and that input cannot be waited or delayed even if input processing cannot be handled. In addition, "real time" may include a method of immediately performing a necessary computational process at a time when data is generated in an information processing scheme by a computer and returning results thereof to a location where the data is generated or where the data is needed. In addition, "real time" refers to an actual time for which a physical process takes place and means time required to process data and obtain necessary results at the same time as the data is generated. The term "real time" may include a method of processing data requested by a user and notifying a result thereof immediately, as a form using a computer, and may include a computer operation processing method of processing data as soon as it is input.

Further, the term "image" may include not only a single (still) image captured by an image sensor but also a plurality of images, or video, captured by a single image sensor. Furthermore, the term "image" may include a plurality of images or video captured by a plurality of image sensors.

According to various embodiments of the present disclosure, an apparatus for recognizing an object may be configured to receive an image including an object and recognize the object of the received image using an artificial neural network for object recognition. In the apparatus for recognizing an object, the accuracy of recognizing objects included in a plurality of images including the same objects and having different image parameters, that is, an object recognition rate, may be different. Here, an image parameter may refer to an arbitrary parameter representing features of an image or a combination thereof. Alternatively, the image parameter may include arbitrary sub-parameters representing each of detailed features of the image. For example, the image parameter may include sub-parameters associated with at least one of demosaicing, wide dynamic range (WDR) or high dynamic range (HDR), deblur, denoise, color tone mapping, white balance, and decompression of an image, but is not limited thereto. The image parameter may include arbitrary parameter or sub-parameter that may represent characteristics of an image.

Figure 1B:
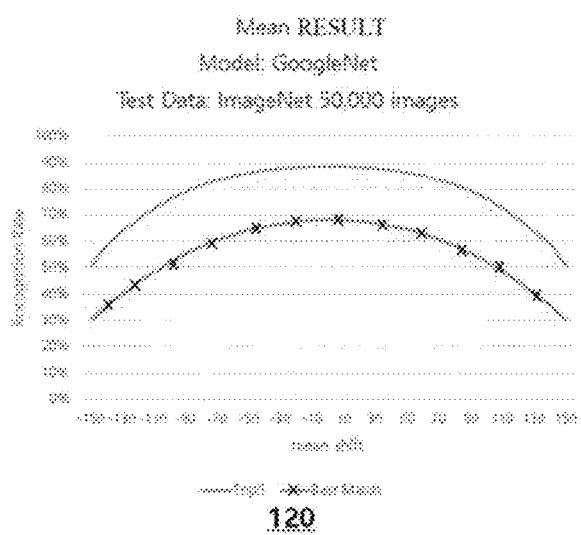
FIG. 1B is a graph representing a recognition rate according to a change in the amount of light.

FIGS. 1A and 1B show exemplary image results 110 and a recognition rate 120 according to a change in the amount of light, respectively. The recognition rate 120 is an experiment result obtained by measuring the recognition rate using GoogleNet, which is a deep-learning recognition model, while adjusting the amount of light in each of 50,000 images from ImageNet.

According to an embodiment, an object recognition rate of a received image may vary depending on a characteristic representing the image, that is, the amount of light as an image parameter or one of a plurality of sub-parameters. Referring to the image result 110 according to a change in the amount of light, the amount of light of the image may be varied by changing a value of $\Delta\mu$, which is an average value of the amount of light of the received image. It is understood that the larger the value of $\Delta\mu$, the greater the amount of light. A preferred image among a plurality of images in which the amount of light of the images obtained by capturing the same object is changed may differ from person to person. In other words, since individual persons have different eye cells in the retina (e.g., cone cells), respective persons who see such images may prefer different images.

On the other hand, in case of a computing apparatus having an apparatus for recognizing an object, since an object is recognized using an artificial neural network for object recognition, there is absolutely no contribution of such preference of the individual in selecting an image. For example, according to preference, a person may select an image with a value of $\Delta\mu$ of 50 as the most appropriate image for object recognition, but as shown in FIGS. 1A and 1B, an object recognition rate of an object recognition module in the apparatus for recognizing an object is the highest when the value of $\Delta\mu$ is 0. That is, when the amount of light has an appropriate value, a recognition rate of a deep-learning recognition model is highest. In the embodiment, GoogleNet is used as the object recognition module, but the present disclosure is not limited thereto, and various object recognition modules using an artificial neural network may be used.

Figure 2A:
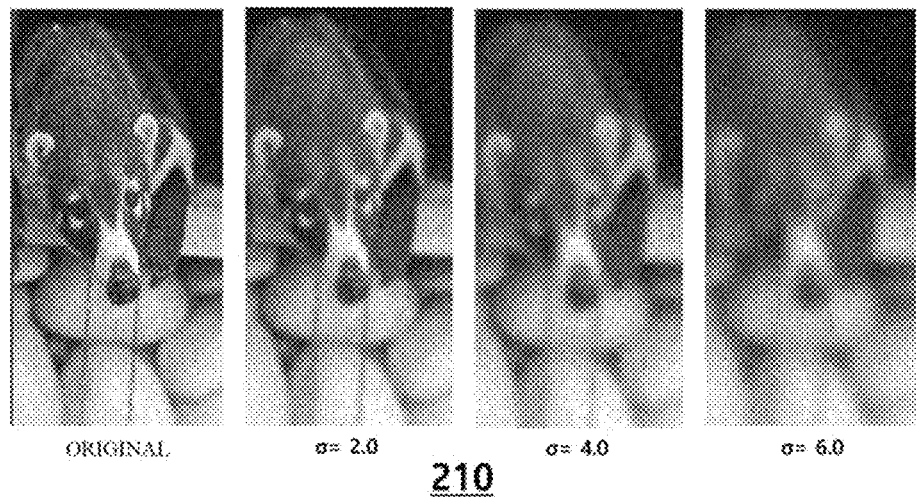
FIG. 2A is a series of exemplary consequent images.
Figure 2B:
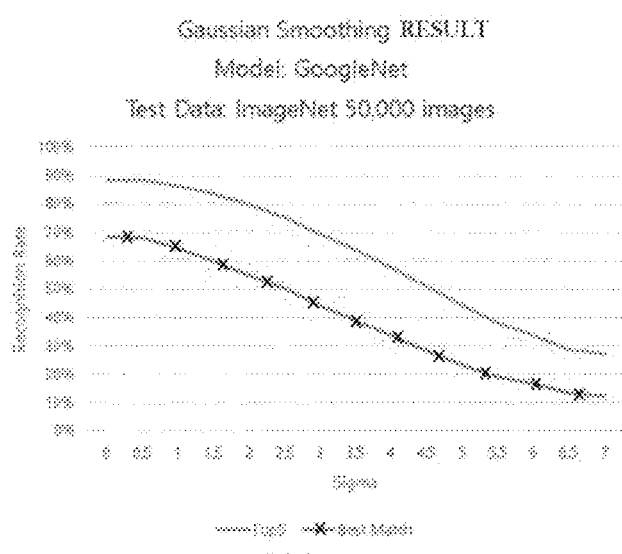
FIG. 2B is a graph representing a recognition rate according to a change in sharpness.

FIGS. 2A and 2B show exemplary image results 210 and a recognition rate 220 according to a change in sharpness, respectively. The recognition rate 220 is an experiment result obtained by measuring the recognition rate using GoogleNet while adjusting the sharpness in each of 50,000 images from ImageNet. Similarly to FIGS. 1A and 1B, the object recognition rate 220 may vary according to sharpness which together with the amount of light is an image parameter or one of a plurality of sub-parameters as well as the amount of light. The sharpness of an image may be varied by changing the value of σ associated with the sharpness of the received image. Referring to the image result 210 according to a change in sharpness, when the value of σ is 0 (that is, when it is the original), the example is clearest, and it can be seen that the image is gradually blurred as the value of σ increases.

Referring to FIG. 2B, when the value of σ is 0, an object recognition rate of an object recognition module in the apparatus for recognizing an object is highest. That is, when the value of a associated with sharpness is the smallest, a recognition rate of a deep-learning recognition model is highest. As described above, GoogleNet was used as the object recognition module, but the present disclosure is not limited thereto, and various object recognition modules using an artificial neural network may be used.

Referring to FIGS. 1A and 1B and FIGS. 2A and 2B, in an object recognition technique using a computing apparatus, it can be understood that when the amount of light in an image has an appropriate value, and sharpness of the image is high, a recognition rate of a deep learning recognition model is high.

As described above, there may be a difference between a high-definition image preferred by a human and an image capable of maximizing a recognition rate of an artificial neural network-based object recognition apparatus. For example, computing apparatuses may have a higher probability of categorizing dogs by breed than humans. That is, before an input image is input to an input layer of an artificial neural network for object recognition, image enhancement processing of the received image may be performed to maximize an object recognition rate through the artificial neural network for object recognition. This image enhancement processing will be described in detail with reference to FIGS. 3 to 8.

While existing image preprocessing techniques are implemented to output high-definition images preferred by humans, an image processing technique targeted in the present disclosure aims to increase a recognition rate of an apparatus for recognizing an object based on an artificial neural network.

Figure 3:
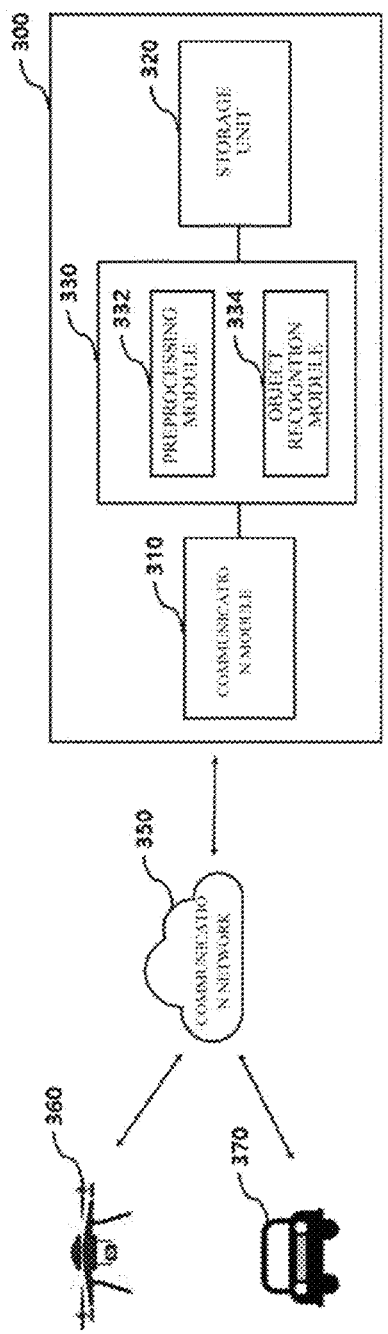
FIG. 3 is a block diagram of an apparatus for recognizing an object in an image according to an embodiment of the present disclosure.

FIG. 3 schematically illustrates an apparatus 300 for recognizing an object in an image according to an embodiment of the present disclosure. The apparatus 300 may include a communication module 310, a storage unit 320, and a processor 330. Here, the processor 330 may be configured to include a preprocessing module 332 and an object recognition module 334.

As illustrated, the communication module 310 of the apparatus 300 for recognizing an object in an image may communicate with an external device such as a motor vehicle 370, a drone 360, or the like via a communication network 350. For example, such an external device (360, 370) may provide an image sensor configured to capture or generate an image including an object, and an arbitrary service (e.g., autonomous driving) based on a recognized object in the image. Depending on an installation environment, the communication network 350 may be variously selected and configured as a wireless network such as WLAN (Wireless LAN), Bluetooth, and ZigBee, and/or a wired network such as Ethernet, a wired home network, a power line communication network, a telephone line communication network, and a network using RS serial communication.

The communication module 310 may be configured to receive an image including an object from at least one of external devices 360 and 370 via the communication network 350. Here, the image may be an image captured through a capturing unit provided in the external devices 360 and 370 and/or an image stored in the external devices, but is not limited thereto. The communication module 310 may provide the image received from the external devices 360 and 370 to the processor 330. In addition, the communication module 310 may be configured to transmit information regarding an object in an image recognized or detected by the processor 330 or information obtained by analyzing or processing such information via the communication network 350.

The processor 330 may perform image enhancement processing on the image received through the communication module 310 and recognize an object included in the image using an artificial neural network for object recognition. In an embodiment, the processor 330 may perform an arbitrary operation work by including at least one of a central processing unit (CPU), a graphic processing unit (GPU), a digital signal processor (DSP), a field programmable gate array (FPGA), and an application specific integrated circuit (ASIC), and may store the received image in the storage unit 320. In addition, the processor 330 may store information on an object recognized from the received image or information obtained by processing the recognized object in the storage unit 320, or provide the information to an external device that has transmitted the image through the communication module 310.

The preprocessing module 332 of the processor 330 may be configured to output a preprocessed image by performing image enhancement processing on the received image so as to improve a recognition rate of the object included in the received image. For example, the image enhancement processing of the received image may include at least one operation processing among denoise operation processing, deblur operation processing, high dynamic range operation processing, color tone mapping operation processing, defog operation processing, brightness operation processing, contrast operation processing, auto white balance operation processing, back light compensation operation processing, and decompression operation processing.

In an embodiment, the preprocessing module 332 may be configured to perform image enhancement processing on the received image by adjusting an image parameter representing the received image. Here, the image parameter may include an image sub-parameter representing at least one of deblur, denoise, wide dynamic range (WDR) or high dynamic range (HDR), color tone mapping, and demosaicing of the received image, but is not limited thereto. The image parameter may include a sub-parameter associated with the image enhancement processing as mentioned above.

The image enhancement processing may include operation processing for preprocessing the image before the received image is input to the artificial neural network for object recognition. An image preprocessing technique may include at least one of an image signal processing technique, a technique for preprocessing an image using a machine learning method, and a technique for preprocessing an image using a deep learning method.

According to an embodiment, the preprocessing module 332 may perform image signal processing on one or more image parameters representing characteristics of the received image. For example, image signal processing for each of a plurality of image parameters may be sequentially performed. That is, after one of the plurality of image parameters is preprocessed, preprocessing of another image parameter may be performed on the image having the processed parameter.

According to another embodiment, the preprocessing module 332 may be configured to use an image preprocessing model for preprocessing one or more image parameters representing characteristics of the received image. Here, the image preprocessing model may be trained using various reference images or videos, and when an image including an object is input, the image preprocessing model may be configured to output a preprocessed image of such an image so as to maximize an object recognition rate of the input image in the artificial neural network for object recognition. As an example, the image preprocessing model includes an image preprocessing probability model, and may be trained through machine learning algorithms to infer a preprocessed image capable of maximizing an object recognition rate by inputting learning data (e.g., various reference images or videos) to an artificial neural network for preprocessing. As another example, the image preprocessing model includes a trained artificial neural network (e.g., a deep neural network or the like), and may be trained through AI learning.

Although it has been described that the preprocessing module 332 performs image enhancement processing of the received image by adjusting image parameters representing characteristics of the received image, the present disclosure is not limited thereto. To increase the object recognition rate of the image, an arbitrary enhancement processing process may be performed on the received image as necessary. In an embodiment, when the received image is a compressed image, the preprocessing module 332 may correct a portion lost due to compression to be closer to an original image.

The object recognition module 334 of the processor 330 may be configured to recognize an object included in the image by inputting the preprocessed image to an input layer of an artificial neural network for object recognition. For example, the object recognition module 334 may infer a type and location of one or more objects included in the preprocessed image. Here, the artificial neural network for object recognition may include an arbitrary artificial neural network that is trained to recognize an object in a reference image by receiving the reference image input and infers an object in the image when the image is input.

According to an embodiment, the artificial neural network for object recognition may include a deep neural network (DNN) including a plurality of layers. For example, the artificial neural network for object recognition may be a pretrained convolutional neural network (CNN), and a type and location of one or more objects included in the received image may be inferred using the pretrained convolutional neural network. Here, the pretrained convolutional neural network may be comprised of one or more layers that perform convolution operations on input values, and may infer output values by performing convolution operations from the input values. Information on the recognized object may be processed by the processor 330, and the information on the recognized object or information obtained by processing it may be transmitted to an external device that has transmitted the image through the communication module 310.

According to an embodiment, the object recognition module 334 may be further configured to generate feedback data associated with a recognition result (e.g., a recognition rate) of an object included in a preprocessed image, which is recognized by an artificial neural network for object recognition. The preprocessing module 332 may be further configured to adjust a variable used for image enhancement processing of the received image based on the generated feedback data. A process in which the object recognition module 334 generates feedback data and performs image enhancement processing of an image based on the generated feedback data will be described in detail with reference to FIG. 5.

Figure 4:
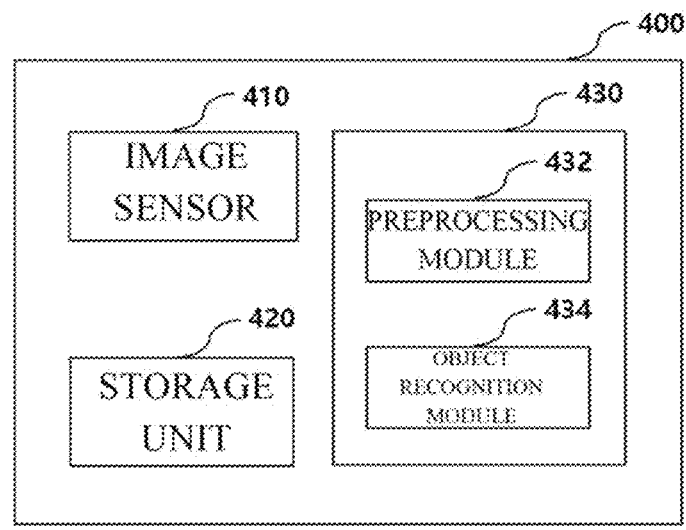
FIG. 4 is a block diagram of an apparatus for recognizing an object in an image according to another embodiment of the present disclosure.

FIG. 4 schematically illustrates an apparatus 400 for recognizing an object in an image according to another embodiment of the present disclosure. The apparatus 400 may have the same or similar configuration as the apparatus 300 of FIG. 3.

The apparatus 400 may include an image sensor 410, a storage unit 420, and a processor 430. Here, the processor 430 may include a preprocessing module 432 and an object recognition module 434. The storage unit 420 of the apparatus 400 may have the same or similar configuration as the storage unit 320 of the apparatus 300; the preprocessing module 432 of the processor 430 may have the same or similar configuration as the preprocessing module 332 of the processor 330; and the object recognition module 434 of the processor 430 may have the same or similar configuration as the object recognition module 334 of the processor 330. In the description of the apparatus 400, content overlapping with that of the description of the apparatus 300 is omitted.

The apparatus 400 may include an image sensor 410 configured to capture or generate an image including an object. That is, unlike the apparatus 300 in FIG. 3, the apparatus 400 includes the image sensor 410, thereby transmitting the image captured from the image sensor 410 to the processor 430 and recognizing the object in the image using the preprocessing module 432 and the object recognition module 434 of the processor 430. In FIG. 4, the image sensor 410 is configured to be included in the apparatus 400, but is not limited thereto. For example, the image sensor 410 may not be included in the apparatus 400, or the image sensor 410 and the apparatus 400 may be configured to be included in one apparatus.

Figure 5:
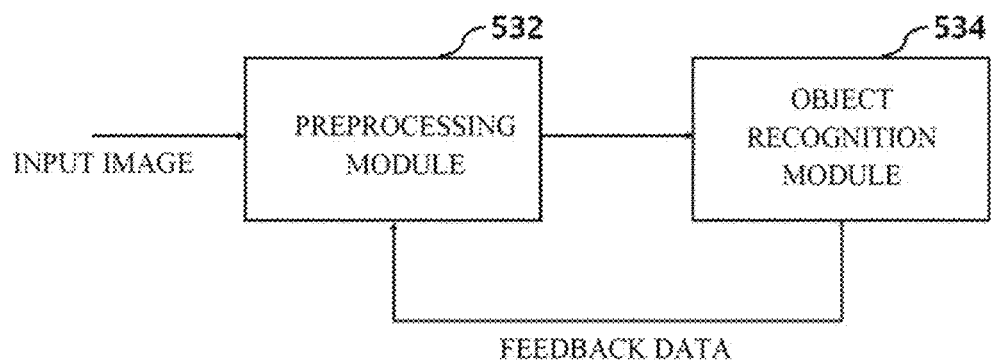
FIG. 5 is a block diagram for illustrating a process according to an embodiment in which an object included in an image is recognized and feedback data is provided.

FIG. 5 illustrates a process of recognizing an object included in an image and providing feedback data. A preprocessing module 532 of FIG. 5 may correspond to the preprocessing module 332 of FIG. 3 and the preprocessing module 432 of FIG. 4. An object recognition module 534 of FIG. 5 may correspond to the object recognition module 334 of FIG. 3 and the object recognition module 434 of FIG. 4. Detailed description of components of FIG. 5 that are the same as or similar to those described in FIG. 3 or 4 may be omitted to avoid redundancy, and only changes or additional parts may be described.

As described above, the communication module 310 of the apparatus 300 may receive an image including an object from an external device using the communication network 350, and may provide the received image to a preprocessing module 532. Unlike this configuration, the image sensor 410 may be mounted in the same apparatus as the apparatus 400, and thereby an image captured by the image sensor 410 may be transmitted to the preprocessing module 532 of the processor.

The preprocessing module 532 may perform image enhancement processing on an image that is input to the preprocessing module 532. In an embodiment, the preprocessing module 532 may use arbitrary functions and variables used for signal processing of an image.

In another embodiment, the preprocessing module 532 may be configured to output a preprocessed image by preprocessing an image input through an image preprocessing model. Here, the image preprocessing model may be an arbitrary probability model for maximizing a recognition rate of an object in an image in an artificial neural network for object recognition. As another example, the image preprocessing model may include an image preprocessing network, such as a convolutional neural network (CNN), a deblur network, a denoise network, or the like.

In another embodiment, the preprocessing module 532 may be implemented by an artificial neural network for preprocessing that has been trained to output a preprocessed image optimized for object recognition as an output value. The trained artificial neural network for preprocessing may be an artificial neural network pretrained through iterative training in such a manner that it receives a plurality of reference images and object recognition results associated with each of the plurality of reference images as input values and outputs a preprocessed image optimized for recognition of an object included in each reference image as an output value. Here, the reference image may be a learning data pair composed of a degraded image and an original image.

According to an embodiment, the preprocessing module 532 may be configured to further include a training module (not shown). A training module of an apparatus for recognizing an object may generate an artificial neural network for preprocessing that infers a preprocessed image optimized for object recognition based on a plurality of reference images and object recognition results associated with each of the plurality of reference images. The generated artificial neural network for preprocessing may be trained through machine learning algorithms to infer preprocessed images optimized for object recognition. For example, the training module may train the artificial neural network so that the artificial neural network infers a preprocessed image pattern optimized for object recognition and outputs a preprocessed image based on the pattern. Thus, the preprocessing module may extract the preprocessed image using the artificial neural network for preprocessing which is generated and trained by the training module.

The preprocessing module 532 may infer a preprocessed image optimized for object recognition by receiving an image received from an external device or an image captured from an image sensor using the trained artificial neural network as an input value, and provide the inferred, preprocessed image to an object recognition module 534.

The object recognition module 534 may recognize an object included in the image by inputting the preprocessed image to an input layer of the artificial neural network for object recognition and generate feedback data associated with a recognition result of the object included in the preprocessed image, which is recognized by the artificial neural network for object recognition. According to an embodiment, the artificial neural network for object recognition may be a pretrained deep neural network (DNN), but is not limited thereto. According to another embodiment, the object recognition module 534 may be configured to detect or recognize an object in an input image using a detector network (e.g., VGG, ResNet, YOLO, SSD, and the like).

According to an embodiment, the feedback data associated with the recognition result of the object may include a determination as to whether the object included in the image is recognized. For example, whether or not the object is recognized may be determined based on whether an object recognition rate exceeds a predetermined threshold recognition rate. As another example, whether or not an object in an image is recognized may be determined by calculating a confidence level as well as a probability of object recognition. The feedback data associated with the recognition result of the object may include arbitrary processing information on the recognition result of the object as well as whether the object is recognized. The generated feedback data may be provided to the preprocessing module 532.

The feedback data associated with the recognition result of the object is not limited to whether or not the object is recognized, and may include various parameters that occur during object recognition, such as an object recognition speed based on a response time to object recognition, the accuracy of object recognition (or an object recognition rate), and parameters of an image where an object is recognized, or various elements involved in the object recognition.

The preprocessing module 532 may adjust a variable used for image enhancement processing of the received image based on the generated feedback data. Here, the variable may be a value varied when an image enhancement processing technique (e.g., signal processing operation) is performed on the received image. For example, this variable may include factors that determine image parameters.

In an embodiment, the preprocessing module 532 may perform image enhancement processing of the received image by adjusting image parameters. For example, the preprocessing module 532 may perform image enhancement processing by adjusting a blur parameter or sub-parameter of the received image using the following equation, which is a Gaussian filter.

$$g_\sigma(x, y) = \frac{1}{2\pi\sigma^2} e^{-(x^2+y^2)/2\sigma^2}$$

Here, σ represents a variable that determines a degree of blurring, and the larger the value of the variable σ, the more the image may be blurred. For example, the preprocessing module 532 may adjust the value of the variable σ based on the feedback data generated by the object recognition module 534, and may perform image enhancement processing on the image received by the adjusted variable, thereby outputting a preprocessed image optimized for object recognition.

According to another embodiment, when the preprocessing module 532 generates an image preprocessing model and performs image enhancement processing on an input image, the image preprocessing model may be trained using feedback data generated by the object recognition module 534, so that the image preprocessing model may be rebuilt or updated. For example, when the image preprocessing model is formed of an artificial neural network, the preprocessing module 532 may analyze the feedback data and correct weight values included in the artificial neural network based on an analyzed result.

Specifically, the preprocessing module 532 may perform training of parameters (for example, weighting) of an artificial neural network for preprocessing based on a recognition result of an object included in an preprocessed image, which is an output value output through a pretrained artificial neural network for object recognition, and feedback data associated with the recognition result, so as to output the preprocessed image capable of maximizing an object recognition rate of an artificial neural network for object recognition. The object recognition module may recognize the object by inputting the preprocessed image optimized for object recognition, which is an output value of the artificial neural network for preprocessing as an input value of the artificial neural network for object recognition. The weight of the artificial neural network for preprocessing may be trained using the object recognition result by the artificial neural network for object recognition, and feedback data associated with the recognition result, and the preprocessed image optimized for object recognition is provided to the artificial neural network for object recognition with the trained artificial neural network for preprocessing, whereby a recognition rate of the artificial neural network for object recognition may be improved.

The artificial neural network for preprocessing and the artificial neural network for object recognition may be pretrained networks such as a deep-learning model, but are not limited thereto. As described above, it is configured to further include a training module to generate and train at least one of an artificial neural network for preprocessing and an artificial neural network for object recognition. Artificial neural networks can be trained using various machine learning algorithms such as deep-learning algorithms.

Figure 6:
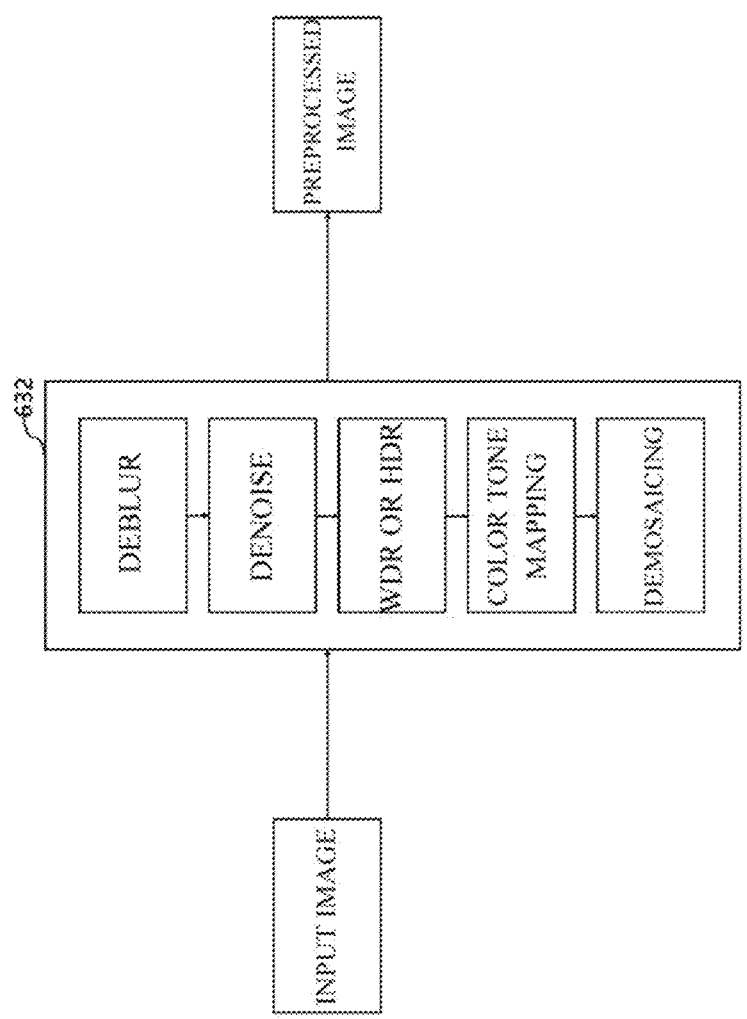
FIG. 6 is a block diagram for illustrating a process according to an embodiment in which image enhancement processing is performed on an image received by a preprocessing module.

FIG. 6 illustrates a process of performing image enhancement processing on an image received by a preprocessing module 632. The preprocessing module 632 of FIG. 6 may correspond to the preprocessing module 332 of FIG. 3 and the preprocessing module 432 of FIG. 4. As described above, the preprocessing module 632 may receive an image received from an external device or an image captured from an image sensor, and may perform image enhancement processing on the received image by adjusting an image parameter representing the received image. Here, the image parameter may include an image sub-parameter representing at least one of deblur, denoise, wide dynamic range (WDR) or high dynamic range (HDR), color tone mapping, and demosaicing of the received image.

According to an embodiment, the preprocessing module 632 may be configured to sequentially perform image enhancement processing on each of a plurality of image sub-parameters. For example, when performing signal processing on each of the plurality of image sub-parameters, a signal-processed result of a sub-parameter, signal processing of which is first performed, may be reflected in signal processing of another sub-parameter to be performed next. As shown, the preprocessing module 632 may be configured to perform image signal processing on deblur, to perform image signal processing on denoise of the image where the signal processing on the deblur has been completed, to perform image signal processing on HDR or WDR of the image where the signal processing on the denoise has been completed, to perform image signal processing on color tone mapping of the image where the signal processing on the HDR or WDR has been completed, and to perform image signal processing on demosaicing of the image where the signal processing on the color tone mapping has been completed.

According to an embodiment, the preprocessing module 632 may perform a preprocessing operation on an input image using a pretrained artificial neural network to infer a preprocessed image optimized for object recognition included in the image. Referring to FIG. 6, the pretrained artificial neural network may input to an input layer an image received from an external device. The artificial neural network may sequentially adjust image sub-parameters representing the input image (e.g., deblur, denoise, WDR (Wide Dynamic Range) or HDR (High Dynamic Range), color tone mapping and demosaicing, in the order of deblur, denoise, WDR (Wide Dynamic Range) or HDR (High Dynamic Range), color tone mapping and demosaicing, as illustrated in FIG. 6, and may output a preprocessed image optimized for object recognition to an output layer.

In another embodiment, the preprocessing module 332 may output preprocessed images by sequentially adjusting sub-parameters using trained multiple artificial neural networks (for example, an artificial neural network for deblur adjustment which is trained to output a preprocessed image optimized for object recognition by adjusting a deblur parameter, an artificial neural network for WDR or HDR adjustment which is trained to output a preprocessed image optimized for object recognition by adjusting a WDR or HDR parameter, and the like) for received images, rather than sequentially adjusting the respective sub-parameters using a trained single artificial neural network.

In FIG. 6, sub-parameters representing deblur, denoise, WDR or HDR, color tone mapping, and demosaicing are exemplarily illustrated as sub-parameters of an image, but the present disclosure is not limited thereto. For example, the image sub-parameter may include arbitrary sub-parameters representing the image. In addition, the order of adjusting sub-parameters is not limited to the order shown in FIG. 6, and this order of adjustment may be changed so that a preprocessed image optimized to increase an image object recognition rate in an artificial neural network for object recognition is output.

Figure 7:
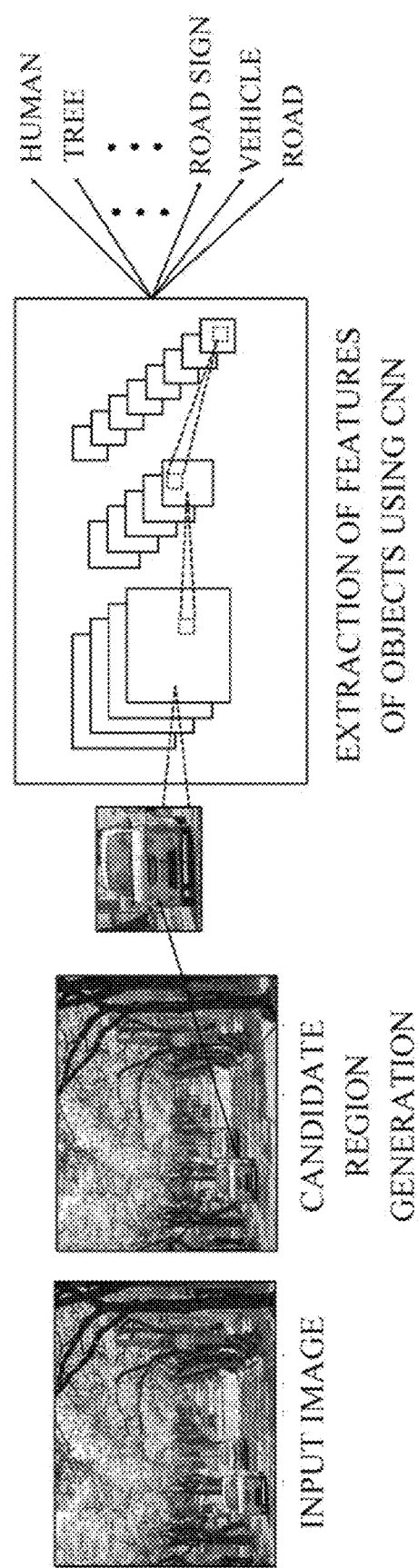
FIG. 7 is an exemplary diagram illustrating a process of recognizing an object included in an image by an object recognition module according to an embodiment of the present disclosure.

FIG. 7 illustrates a process of recognizing an object included in an image by an object recognition module according to an embodiment of the present disclosure. In the embodiment, the object recognition module may recognize an object included in a received image using a region-based convolutional neural network (R-CNN).

As illustrated in FIG. 7, the R-CNN may generate candidate regions from an input image using a selective search algorithm. Each of the generated candidate regions may be converted to have the same size, and features of an object included in the image may be extracted through a CNN. Objects in the candidate region can be classified using the extracted features with the use of a support vector machine.

As shown in FIG. 7, the objects included in the image may be classified into various categories such as a human, a tree, a vehicle, and the like. The object recognition module may detect or recognize an object in an image based on the classified objects.

FIG. 7 exemplarily discloses that the object recognition module uses the R-CNN, but the present disclosure is not limited thereto, and the object recognition module may use any artificial neural network capable of recognizing an object in an image. In addition, an artificial neural network for object recognition by R-CNN may recognize an object included in new image data using a pretrained network such as AlexNet or GoogleNet. Alternatively, the apparatus for recognizing an object in an image may be configured to further include a training module to train an artificial neural network for object recognition through the training module. The artificial neural network for object recognition may learn features for classifying respective objects by analyzing thousands to tens thousands of pieces of learning data (learning images) and learn how to identify differences between respective objects.

Figure 8:
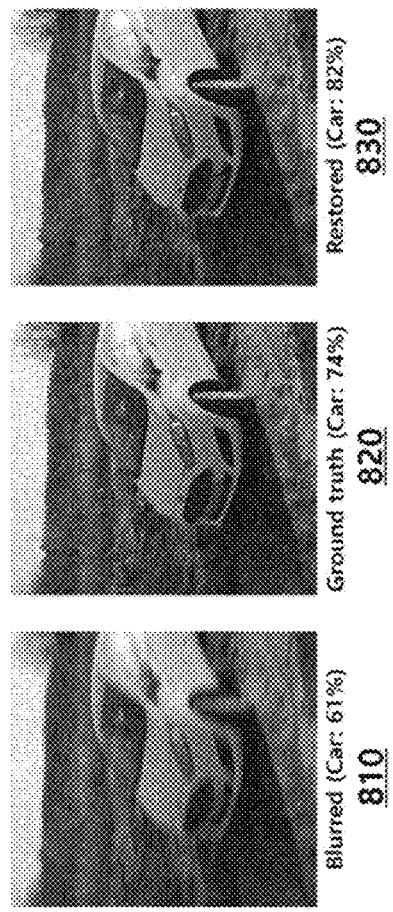
FIG. 8 is an exemplary diagram showing a result of recognizing an object included in an image.

FIG. 8 shows a result of recognizing an object included in an image. Referring to FIG. 8, it can be understood that when an object in an image 810 that shook during capture (blurred) is recognized through a deep neural network, an object recognition rate is 61%, while an object in an image 820 captured normally (ground truth) is recognized through a deep neural network, an object recognition rate is 74%.

In an embodiment, the preprocessing module of the apparatus for recognizing an image object in the present disclosure may perform image enhancement processing by deblur processing a received image, and the object recognition module may recognize an object included in an image obtained through deblur processing of the shaken image 810 using a deep neural network. As a result of recognizing an object in the image where image enhancement processing has been performed through the preprocessing module, it could be understood that the shaken image 810 was restored like a restored image 830, and an object recognition rate was 82%, which is higher than that of the image captured in a shaken state. In other words, in recognizing an object in an image through an artificial neural network for object recognition, the preprocessing module preprocesses an input image before inputting the image to the artificial neural network for object recognition, thereby increasing the probability of recognizing the object in the image through the artificial neural network for object recognition.

Figure 9:
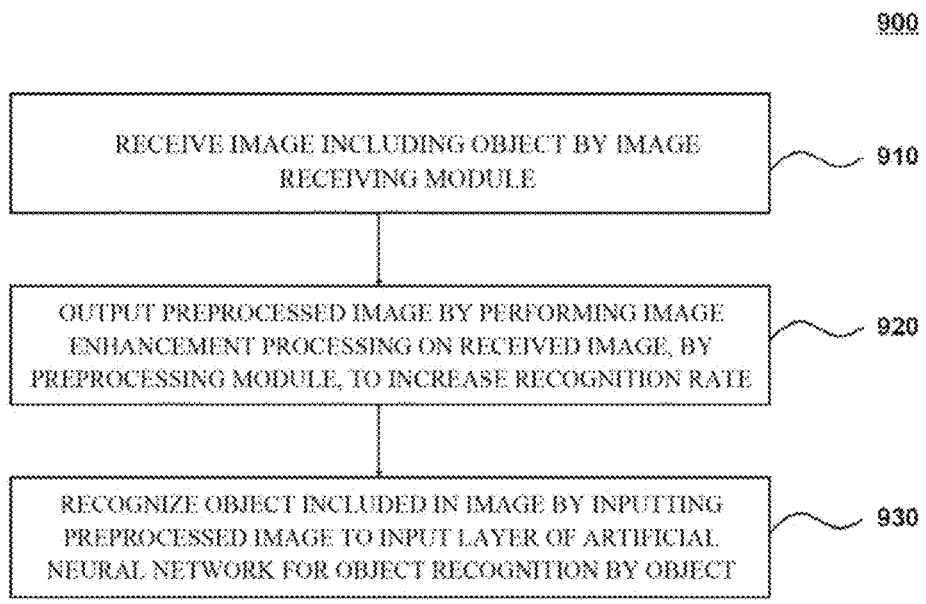
FIG. 9 is a flowchart of a method for recognizing an object in an image according to an embodiment of the present disclosure.

FIG. 9 illustrates a method 900 of recognizing an object in an image according to an embodiment of the present disclosure. The method 900 may include a step 900 of receiving an image including an object by a communication module. Such an image may include at least one of an image received from an external device through a communication module in the apparatus for recognizing an image object, and an image captured by an image sensor in the apparatus for recognizing an image object.

The preprocessing module may perform image enhancement processing on the received image, before recognizing the object, so as to improve a recognition rate of an object included in the received image, and may output a preprocessed image in a step 920. The preprocessing module may perform image enhancement processing of the received image by adjusting image parameters. The preprocessed image may be provided to an object recognition module.

The object recognition module may recognize the object included in the image by inputting the preprocessed image to an input layer of an artificial neural network for object recognition in a step 930. In an embodiment, the artificial neural network for object recognition may be a pretrained convolutional neural network (CNN), but is not limited thereto. For example, the object recognition module may infer a type and location of one or more objects included in the received image using the pretrained convolutional neural network.

The apparatus for recognizing an object in an image as described above may be implemented as a computer-readable code in a computer-readable recording medium. The computer-readable recording medium includes all types of recording devices that store data capable of being readable by a computer system. Examples of computer-readable recording mediums include ROM, RAM, CD-ROM, magnetic tapes, floppy disks, and optical data storage devices. In addition, the computer-readable recording medium is distributed over a computer system connected through a network, so that computer-readable codes may be stored and executed in a distributed manner. In addition, functional programs, codes, and code segments for implementing the above embodiments may be easily inferred by programmers in the technical field to which the present disclosure belongs.

The techniques described herein may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends on the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described herein, computers, or combinations thereof.

Thus, the various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random-access memory (RAM), read-only memory (ROM), non-volatile random-access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media may include both computer storage media and communication media including any medium that facilitates transfer of a computer program from one place to another. A storage media may be any available media that can be accessed by a general purpose or special purpose computer. By way of example, and not limitation, such computer-readable media may include RAM, ROM, EEPROM, CD-ROM, or other optical disk storage; magnetic disk storage or other magnetic storage devices; or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer readable medium. Disk and disc, as used herein, includes CD, laser disc, optical disc, digital versatile disc (DVD), floppy disk and blue-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the method mentioned in this specification has been described through specific embodiments, it is possible to implement it as computer-readable codes on a computer-readable recording medium. The computer-readable recording medium includes all types of recording devices that store data capable of being read by a computer system. Examples of computer-readable recording mediums include ROM, RAM, CD-ROM, magnetic tapes, floppy disks, and optical data storage devices. In addition, the computer-readable recording medium is distributed over a computer system connected through a network, so that computer-readable codes may be stored and executed in a distributed manner. In addition, functional programs, codes, and code segments for implementing the above embodiments may be easily inferred by programmers in the technical field to which the present disclosure belongs.

What is claimed is:

1. An apparatus for recognizing an object in an image, the apparatus comprising:
a processor configured to
receive an image including the object;
output a preprocessed image by performing image enhancement processing on the received image to increase a recognition rate of the object included in the received image;
recognize the object included in the image by inputting the preprocessed image to an input layer of an artificial neural network for object recognition;
input a plurality of preprocessed reference images to the input layer of the artificial neural network for object recognition, each of the plurality of reference images including an object; and
generate feedback data associated with a recognition result of the object included in each of the plurality of preprocessed reference images,
wherein the processor is further configured to output the preprocessed image by inputting the received image including the object to an artificial neural network for preprocessing, so as to increase the recognition rate of the object included in the received image in the artificial neural network for object recognition, and
wherein the artificial neural network for preprocessing is trained, using the feedback data, to infer the plurality of preprocessed reference images that are optimized for an increase in object recognition rate through the artificial neural network for object recognition.

2. The apparatus of claim 1,
wherein the artificial neural network for object recognition includes a deep neural network including a plurality of layers, and
wherein the processor is further configured to infer a type and location of the object included in the preprocessed image input through the artificial neural network for object recognition.

3. An apparatus for recognizing an object in an image, the apparatus comprising:
a processor configured to
receive an image including the object;
output a preprocessed image by performing image enhancement processing of brightness operation processing and contrast operation processing and at least one image enhancement processing among denoise operation processing, deblur operation processing, high dynamic range operation processing, color tone mapping operation processing, defog operation processing, auto white balance operation processing, back light compensation operation processing, or decompression operation processing, on the received image, to increase a recognition rate of the object included in the received image; and
recognize the object included in the image by inputting the preprocessed image to an input layer of an artificial neural network for object recognition.

4. The apparatus of claim 3, wherein the processor is further configured to perform an image enhancement process on the received image by adjusting an image parameter representing the received image, the image parameter including deblur.

5. The apparatus of claim 4,
wherein the image parameter includes a plurality of image sub-parameters representing the received image, and
wherein the processor is configured to sequentially perform an image enhancement process on each of the plurality of image sub-parameters, the sequentially performed processes including
image signal processing on deblur,
image signal processing on denoise of the image where the signal processing on the deblur has been completed,
image signal processing on wide dynamic range (WDR) or high dynamic range (HDR) of the image where the signal processing on the denoise has been completed,
image signal processing on color tone mapping of the image where the signal processing on the WDR or HDR has been completed, and
image signal processing on demosaicing of the image where the signal processing on the color tone mapping has been completed.

6. A method for recognizing an object in an image, the method comprising:
receiving an image including the object at a preprocessing module;
outputting a preprocessed image by performing image enhancement processing on the received image, by the preprocessing module, to increase a recognition rate of the object included in the received image;
recognizing the object included in the image by inputting the preprocessed image to an input layer of an artificial neural network for object recognition, by an object recognition module;
inputting, to the object recognition module, a plurality of preprocessed reference images to the input layer of the artificial neural network for object recognition, each of the plurality of reference images including an object; and
generating, by the object recognition module, feedback data associated with a recognition result of the object included in each of the plurality of preprocessed reference images,
wherein the outputting of the preprocessed image by the preprocessing module includes outputting the preprocessed image by inputting the received image including the object to an input layer of an artificial neural network for preprocessing so as to increase a recognition rate of the object included in the received image, and
wherein the outputting of the preprocessed image by the preprocessing module includes training the artificial neural network for preprocessing is trained, using the feedback data, to infer the plurality of preprocessed reference images that are optimized for an increase in object recognition rate through the artificial neural network for object recognition.

7. A method for recognizing an object in an image, the method comprising:
receiving an image including the object;
outputting a preprocessed image, by a preprocessing module, by performing image enhancement processing of brightness operation processing and contrast operation processing and at least one image enhancement processing among denoise operation processing, deblur operation processing, high dynamic range operation processing, color tone mapping operation processing, defog operation processing, auto white balance operation processing, back light compensation operation processing, and decompression operation processing, on the received image, so as to increase a recognition rate of the object included in the received image; and
recognizing the object included in the image by inputting the preprocessed image to an input layer of an artificial neural network for object recognition, by an object recognition module.

8. The method of claim 7, further comprising:
performing an image enhancement process on the received image by adjusting an image parameter representing the received image,
wherein the image parameter includes deblur.

9. The method of claim 8,
wherein the image parameter includes a plurality of image sub-parameters representing the received image, and
wherein the processor is configured to sequentially perform an image enhancement process on each of the plurality of image sub-parameters, the sequentially performed processes including
image signal processing on deblur,
image signal processing on denoise of the image where the signal processing on the deblur has been completed,
image signal processing on wide dynamic range (WDR) or high dynamic range (HDR) of the image where the signal processing on the denoise has been completed,
image signal processing on color tone mapping of the image where the signal processing on the WDR or HDR has been completed, and
image signal processing on demosaicing of the image where the signal processing on the color tone mapping has been completed.

10. An apparatus comprising:
a first artificial neural network model, including a weight value, configured to input an image and output a preprocessed image by using the weight value;
a second artificial neural network model configured to receive the preprocessed image and output a recognized object included in the preprocessed image; and a processor configured to process the first artificial neural network model and the second artificial neural network model, wherein the weight value is updated by a feedback data based on a recognition result of a reference object included in each of a plurality of preprocessed reference images through iterative training by inputting the plurality of preprocessed reference images, and wherein the weight value is determined to perform image enhancement processing in order to increase a recognition rate of the recognized object included in the preprocessed image input to the second artificial neural network model.

11. The apparatus of claim 10, further comprising:
a training module configured to update the weight value through iterative training by inputting the plurality of preprocessed reference images.

12. The apparatus of claim 10, wherein the feedback data input to the first artificial neural network model is generated from the second artificial neural network model.

* * * * *